(12) United States Patent
Doering et al.

(10) Patent No.: US 8,224,050 B2
(45) Date of Patent: Jul. 17, 2012

(54) METHOD FOR THE CREATION OF PANORAMIC IMAGES OF THE EYE FUNDUS

(75) Inventors: Axel Doering, Jena (DE); Michael Trost, Stadtroda (DE); Daniel Baumgarten, Erfurt (DE)

(73) Assignee: Carl Zeiss Meditec AG, Jena (DE)

( * ) Notice: Subject to any disclaimer, the term of this patent is extended or adjusted under 35 U.S.C. 154(b) by 842 days.

(21) Appl. No.: 12/375,350

(22) PCT Filed: Jul. 19, 2007

(86) PCT No.: PCT/EP2007/006406
§ 371 (c)(1),
(2), (4) Date: Jan. 27, 2009

(87) PCT Pub. No.: WO2008/012021
PCT Pub. Date: Jan. 31, 2008

(65) Prior Publication Data
US 2011/0058715 A1    Mar. 10, 2011

(30) Foreign Application Priority Data
Jul. 28, 2006   (DE) .......................... 10 2006 034 911

(51) Int. Cl.
*G06K 9/00*   (2006.01)
(52) U.S. Cl. .......................... 382/128; 382/284; 351/206
(58) Field of Classification Search .................. 382/117, 382/128, 284, 294; 351/206; 348/78
See application file for complete search history.

(56) References Cited

U.S. PATENT DOCUMENTS

| | | | |
|---|---|---|---|
| 4,715,703 A | 12/1987 | Cornsweet et al. | |
| 5,680,150 A | 10/1997 | Shimizu et al. | |
| 6,082,859 A | 7/2000 | Okashita et al. | |
| 6,454,410 B1 | 9/2002 | Berger et al. | |
| 2004/0085514 A1* | 5/2004 | Fransen | 351/206 |
| 2004/0254477 A1 | 12/2004 | Sekiguchi | |

(Continued)

FOREIGN PATENT DOCUMENTS
EP    0 655 712 A2    5/1995
(Continued)

OTHER PUBLICATIONS

Maurer, Calvin R., Jr., et al., "A Review of Medical Image Registration," *Interactive Image Guided Neurosurgery*, pp. 17-44 (Sep. 1993).

(Continued)

*Primary Examiner* — Andrew W Johns
(74) *Attorney, Agent, or Firm* — Patterson Thuente Christensen Pedersen P.A.

(57) ABSTRACT

A method for creating or calculating panoramic images of the eye fundus particularly from images of a fundus camera. In the method a pre-positioning process is carried out in which a first variable is determined for geometrically associating the images with each other. An anchor image is determined as a reference for the first variables for the geometric association; areas that are associated with each other are determined in the anchor image and the other images by a block-matching algorithm; transformation parameters for a geometric transformation between the anchor image and the other images are determined from the mutual position of the associated areas; and the other images are transformed onto the anchor image by transformation parameters and are superimposed onto the anchor image and among each other.

12 Claims, 1 Drawing Sheet

U.S. PATENT DOCUMENTS

2007/0292010 A1* 12/2007 Allon et al. .................. 382/128

FOREIGN PATENT DOCUMENTS

| EP | 1 024 455 A2 | 8/2000 |
| --- | --- | --- |
| JP | 11-332832 A | 12/1999 |

OTHER PUBLICATIONS

Maintz, J.B., et al., "A Survey of Medical Image Registration," *Medical Image Analysis, Oxford University Press*, vol. 2, No. 1, pp. 1-37 (1998).

Ryan, N., et al., "Registration of Digital Ophthalmic Images Using Vector Vector Mapping," *IEEE, Proceedings on the International Conference on Image Processing*, vol. 2, pp. 459-462 (Sep. 2000).

Mendonça, Ana Maria, et al., "A New Similarity Criterion for Retinal Image Registration," *IEEE, Proceedings on the International Conference on Image Processing*, vol. 3, pp. 696-7000 (Nov. 1994).

Chanwimaluang, Thitiporn, et al., "Hybrid Retinal Image Registration," *IEEE, Translations on Information Technology in Biomedicine*, vol. 10, No. 1, pp. 129-142 (Jan. 2006).

Chanwimaluang, Thitiporn, et al., "An Efficient Blood Vessel Detection Algorithm for Retinal Images Using Local Entropy Thresholding," *IEEE, Proceedings of the 2003 Symposium on Circuits and Systems*, vol. 5, pp. V-21-24 (2003).

Chaudhuri, Subhasis, et al., "Detection of Blood Vessels in Retinal Images Using Two-Dimensional Matched Filters," *IEEE, Transactions on Medical Imaging*, vol. 8, No. 3, pp. 263-269 (Sep. 1989).

* cited by examiner

METHOD FOR THE CREATION OF PANORAMIC IMAGES OF THE EYE FUNDUS

PRIORITY CLAIM

The present application is a National Phase entry of PCT Application No. PCT/EP2007/006406, filed Jul. 19, 2007, which claims priority from German Application Number 102006034911.3, filed Jul. 28, 2006, the disclosures of which are hereby incorporated by reference herein in their entirety.

FIELD OF THE INVENTION

The invention relates to a method for creating or calculating panoramic images of the eye fundus particularly from images of a fundus camera.

BACKGROUND OF THE INVENTION

The creation of large-surface composition images (also called panoramic images) of the eye fundus is necessary for the diagnosis and monitoring of various eye diseases, for example, diabetic retinopathy. Due to optical and physiological limitations, the imaging of solid angles >50° is not possible with standard fundus cameras. Therefore, in order to create composition images, which cover a greater solid angle, overlapping partial images are taken and combined accordingly. Thereby, the images must be associated with each other in a geometrically exact fashion; furthermore, very often a matching of intensities and/or colors is required. Position and sequence of the partial images are partially predefined through clinical protocols (e.g., ETDRS=Early Treatment Diabetic Retinopathy Study).

In analog fundus photography, prints are cut from partial images, shifted and rotated against each other and glued together to form a composition image. Thereby, the technician attempts to overlap with best possible accuracy prominent points (mostly blood vessels of the eye fundus with characteristic curves or branches). This method is time-consuming, limited to translatory and rotational corrections, and of limited reproducibility. Due to varying exposure conditions, the borders of the partial images are boosted which makes the diagnosis of composition results more difficult.

If partial images are available in electronic form, transformations can be determined through manual marking of corresponding points in different partial images, and which produce an ideal composition (generally, in the sense of minimizing the residual flaws at the corresponding points after executing the transformation).

Said methods require a significant and time-consuming interaction by the technician. First, a rough arrangement of the partial images must be determined. Then, prominent points ("landmarks," e.g., blood vessel branches) must be determined in every partial image and the corresponding points marked in at least one other partial image. Very often, the technician must switch between different levels of resolution of the representation. Through analysis of the corresponding points, various geometric transformations can be calculated, depending on the number of landmarks. Superimposition of the appropriately transformed partial images results in a (digital) composition image.

It has also been suggested that the corresponding landmarks be determined automatically (i.e., computer-assisted). In the article by Chanwimaluang et al., "Hybrid Retinal Image Registration" *IEEE Transactions on Information Technology in Biomedicine* 10(I): 129-142 (2006), corresponding landmarks, based on landmark candidates of a partial image, are determined in other partial images on the basis of different similarity measures and statistical analyses.

The rest of the process (calculation of ideal transformations, superimposition of partial images) is analog to the above described semiautomatic method. In order to reduce the computational effort, a two-step method is suggested, whereby the shift between two images is calculated before the control point registration, which is achieved by means of the transformation and various optimization techniques.

Said method is disadvantageous due to the poor robustness, since the detected landmarks must meet criteria, which are influenced by the imaging quality (focusing, exposure) and the framing. Furthermore, an even distribution of the specific landmarks on the partial images is not guaranteed. As a result, only individual (structurally complex) areas of the image may be included in the determination of the transformation and, e.g., a scaling in the periphery may not be included. The number of landmarks used for determining the transformation is image-dependent and, therefore, generally unpredictable.

Other suggested methods, e.g., the reconstruction of the blood vessels of the eye fundus in the form of a geometric tree require an extraordinary amount of calculations (e.g., Chanwimaluang et al., "An efficient blood vessel detection algorithm for retinal images using local entropy thresholding," *ISCAS* (5) 2003: 21-24).

The Japanese patent application JP 11-332832 suggests that the imaging parameters, such as direction and magnification, of every partial image are saved and, therefore, produce panoramic images analytically and without the use of the image content.

It is known, e.g., from U.S. Pat. No. 4,715,703, to provide a fundus camera with an aperture mask (field stop) in order to mask off unwanted scattered light.

In US patent application 2004/0254477, it is suggested that a virtual field stop, instead of a real field stop, is defined through user input of the diameter, and to manipulate the grey values and/or the pixels of the (rectangular) digital image in such a way that the impression of a picture with field stop is created.

SUMMARY OF THE INVENTION

It is the task of the invention to overcome the aforementioned disadvantages of prior art and to present an effective, automatically executable method for the creation of panoramic images of the eye fundus.

This task, according to the invention, for the method for the creation of panoramic images of the eye fundus, whereby several initial images which show different segments of the eye fundus are available digitally, is solved in that a pre-positioning process is carried out in which a first variable is determined for relative geometrically associating the images with each other;

an anchor image is determined as a reference for the first variables for the relative geometric association;

areas that are associated with each other are determined in the anchor image and the other images by means of a block-matching algorithm;

transformation parameters for a geometric transformation between the anchor image and the other images are determined from the mutual position of said associated areas; and the other images are transformed onto the anchor image by means of said transformation parameters and are superimposed onto the anchor image and among each other.

Thereby, it is particularly advantageous if a field mask is determined or input in the initial images and the image segments outside the field mask are filtered out, and further calculations are carried out solely with image segments of the individual initial images, which are positioned inside the field mask.

According to the invention, the pre-positioning process is carried out through calculation of a two-dimensional cross correlation between the initial images, whereby, preferably, a down scaling and/or resolution decrease of the initial images is carried out beforehand. Thereby, particularly good results were achieved if the structures in the images, such as blood vessels or similar objects, were, e.g., enhanced with regard to their contrast or highlighted in other ways.

Advantageously, an anchor image is determined through the pre-positioning process, whereby the number of mutual areas and/or the distances of the mutual areas of the initial images are evaluated.

It is of particular advantage if the block-matching algorithm is essentially applied only to those areas of the respective initial images for which the pre-positioning process is expected to produce a possible overlapping of the initial images.

According to the invention, in the areas of the respective initial images for which the pre-positioning process is expected to produce a possible overlapping of the initial images, a determination of partial areas particularly suited for block matching is carried out through structural analysis, and the block-matching algorithm is, preferably, applied to said partial areas. This structural analysis can be carried out, e.g., through determination of a maximum information entropy or standard deviation of the image pixels in the partial areas.

It has proven particularly successful if the transformation parameters between the anchor image and the other initial images are determined by means of a quadratic approach, whereby, particularly, the transformation parameters between other initial images, which share mutual areas, are also determined and a transformation parameter set, suitable for all initial images, is determined preferably through optimization.

It is of particular advantage if a matching of brightness and/or color of the images is carried out during superimposition of the other images onto the anchor image and among each other. Particularly, this can be achieved successfully if structures, such as blood vessels which appear brightly in the images, are matched with each other.

In the following, the invention is described with reference to an example embodiment.

DETAILED DESCRIPTION

Automatic Determination of the Field Mask

Figure 1:
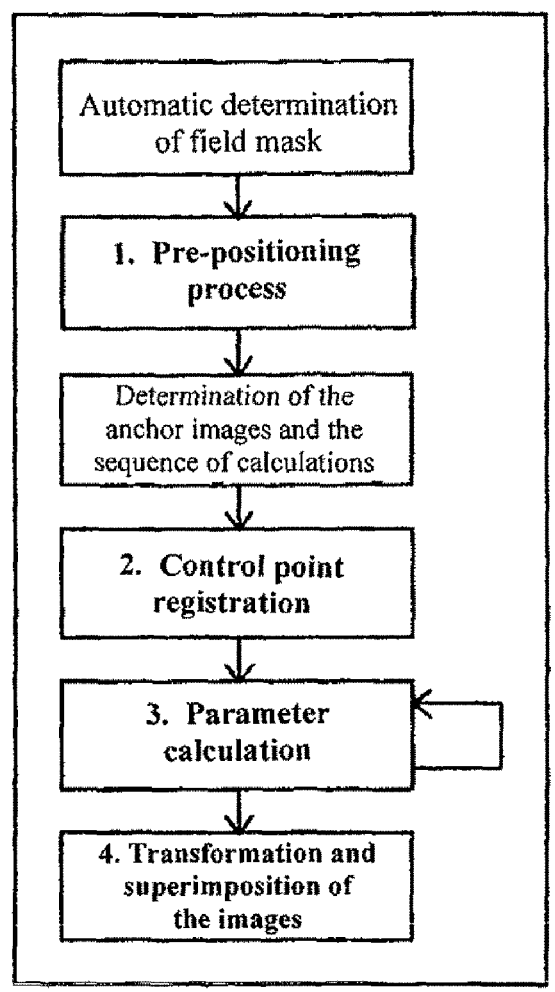
FIG. 1 shows a flowchart of this example method.
Figure 2:
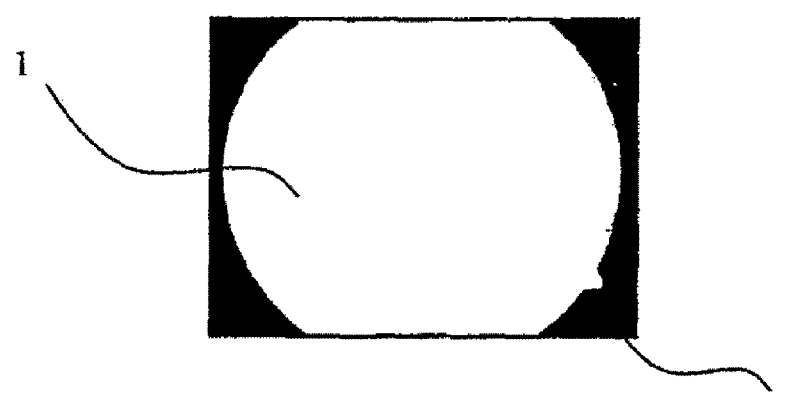
FIG. 2 shows an example the result of applying a mask to an initial image.

Prior to the actual registration method, an automatic determination of the field stop by means of a surface criteria and analysis of the histogram over the entire image is carried out for all individual images. Since the area outside of the field mask is, by definition, dimmed and, therefore, darker than the actual image content, a threshold, which separates the pixels belonging to both areas, is easily determined from the histogram (=frequency distribution of the grey and/or color values of the pixels over the entire image). In order to eliminate possible strays, a generally known erosion method is used which results in the actual image content to be present in a coherent area. FIG. 2 shows an example of such a result, whereby the actual image content 1 is surrounded by the discriminated area 2 of the field stop.

1. Pre-Positioning Process

In the first step, a pre-positioning process is determined and evaluated between all possible pairs of individual images. Thereto, the mostly high-resolution initial images (e.g., approximately 2000×2000 pixels) are down-scaled, for example, to 250×250 pixels, in order to save computation time. Furthermore, it has proven helpful to highlight structures, which are present in the images, such as blood vessels, through respective generally known algorithms (e.g., Chaudhuri et al.: "Detection of blood vessels in retinal images using two-dimensional matched filters," *IEEE Transactions on Medical Imaging*, vol. 8 (1989), no. 3, p. 263-269; Chanwimaluang et al., "An efficient blood vessel detection algorithm for retinal images using local entropy thresholding," *Proceedings International Symposium on Circuits and Systems*, vol. 5 (2003), p. 21-24). The preliminary determination of the mutual positions of the images is area-based, e.g., through a two-dimensional cross correlation, $$C(i, j) = \sum_{m=0}^{(M-1)} \sum_{n=0}^{(N-1)} A(m, n) \cdot B(m+i, n+j)$$

whereby C( ) represents the cross-correlation coefficients, and A( ) and B( ) the two images to be compared. The maximum of the cross-correlation coefficient results, in known fashion, in the two-dimensional shift among the images. If no distinct maximum results from the cross-correlation coefficient, it is proven that the two images do not overlap.

Determination of the Anchor Image and the Sequence of Calculations:

Based on said determined shifts, an anchor image and the sequence of calculations of the transformations of the partial images are determined. For the anchor image, an image is chosen, which shares an overlapping area with most of the other images. If several images appear identical, it is recommended to determine and compare the sum of the shifts of the potential candidates for the anchor images to all other images, and to chose as anchor image the one for which said sum is the smallest. In order to determine the sequence of calculations, the other images are preferably arranged in the order of the extent of the shift, and the smallest shift used as a starting point.

2. Control Point Registration

The second step involves the objective, characteristics-independent determination of the control point pairs by means of the (preferably hierarchical) block-matching method. Thereby, a block selection criterion, a suitable similarity measure, e.g., the correlation coefficient, are used. For example, the information entropy $$H = \sum_i p_i \log \frac{1}{p_i} = -\sum_i p_i \log p_i$$

or the standard deviation $$s = \sqrt{\frac{1}{n-1}\sum_{i=1}^{n}(x_i - \bar{x})^2}$$

can be used as block selection criterion in order to determine areas, which exhibit sufficient "structure" in order to lead to sufficient results during matching. Thereby, in every overlapping area, partial blocks of, e.g., 25×25 pixels, are formed in order to form those partial blocks, which are maximal for the entropy or the standard deviation. With these partial blocks selected in said fashion, matching between the images is carried out, whereby the computation time is kept within limits through respective limitation of the number of partial blocks. Also, partial blocks used for matching can be chosen according to geometric aspects in order to provide for a best possible even distribution in the overlapping area. Once again, the correlation algorithm $$c = \frac{\sum_m \sum_n (A_{mn} - \bar{A})(B_{mn} - \bar{B})}{\sqrt{\left(\sum_m \sum_n (A_{mn} - \bar{A})^2\right)\left(\sum_m \sum_n (B_{mn} - \bar{B})^2\right)}}$$

can, preferably, be used as matching algorithm, but other area-based algorithms are also possible.

The results of the matching are coordinate values of corresponding points in the various images.

3. Parameter Calculation

The transformation parameters for geometrically associating the images with each other are determined by means of a quadratic approach:

$$\begin{pmatrix} u \\ v \end{pmatrix} = \begin{pmatrix} a_1 & a_2 & a_3 & a_4 & a_5 & a_6 \\ b_1 & b_2 & b_3 & b_4 & b_5 & b_6 \end{pmatrix} \begin{pmatrix} 1 \\ x \\ y \\ xy \\ x^2 \\ y^2 \end{pmatrix}$$

Thereby, u, v are the coordinate values in the anchor image (or the initial image if the viewed image shows no overlapping with the anchor image), and x, y the respective coordinate values of the respective points in the other viewed image. The $a_i$, $b_i$ are altogether 12 parameters for the transformation between the two images, which now form together with the respective equations for the other control points in the overlapping area between the images an overdefined equation system, which, e.g., is solved according to the method of the least squares (or any other suitable numerical method).

After such calculation is carried out for every image connected to the anchor image as well as images adjacent to those images, which are possibly not connected to the anchor image, a complete set of transformation parameters is available, with which all images can be transformed into the coordinate system of the anchor image (including those without connection to the anchor image).

4. Transformation and Superimposition of the Images

With said transformation parameters, all images are now transferred to the coordinate system of the anchor image. Since interfering structures may occur between the various images in the mutual image due to differences in illumination, a grey value and color matching is now carried out in the generally known fashion. Thereby, it has proven advantageous to match the lighter parts of the images with each other (blood vessels and similar objects) and only subsequently match the structureless background.

With this herein presented new method, geometrically and photometrically faultless panoramic images can be automatically produced.

The invention is not bound to the described preferred embodiment; expert modifications do not lead to the abandonment of the degree of protection defined by the Claims.

The invention claimed is:

1. A method for creating panoramic images of an eye fundus from several initial digital images, which show different segments of the eye fundus, comprising:
   carrying out a pre-positioning process in which a first variable is determined for geometrically associating the images with each other;
   determining an anchor image as a reference for the first variable for the geometric association;
   determining associated areas that are associated with each other in the anchor image and the other images by use of a block-matching algorithm;
   determining transformation parameters for a geometric transformation between the anchor image and the other images from the mutual position of said associated areas;
   transforming the other images onto the anchor image by use of said transformation parameters; and
   superimposing the other images onto the anchor image and among each other.

2. The method for creating panoramic images of the eye fundus, according to claim 1, further comprising determining or inputting a field mask in the initial images and filtering out image segments outside the field mask.

3. The method for creating panoramic images of the eye fundus, according to claim 1, further comprising determining or inputting a field mask in the initial images and filtering out the image segments outside the field mask and wherein the steps recited in claim 1 are carried out solely with image segments of the individual initial images, which are positioned within the field mask.

4. The method for creating panoramic images of the eye fundus, according to claim 1, further comprising carrying out the pre-positioning process through calculation of a two-dimensional cross correlation between the initial images.

5. The method for creating panoramic images of the eye fundus, according to claim 4, further comprising down scaling and/or decreasing resolution of the initial images before the prepositioning process.

6. The method for creating panoramic images of the eye fundus, according to claim 1, further comprising determining an anchor image through the pre-positioning process, wherein the number of mutual areas and/or the distances of the mutual areas of the initial images are evaluated.

7. The method for creating panoramic images of the eye fundus, according to claim 1, further comprising applying the block-matching algorithm only to those areas of the respective initial images for which the pre-positioning process is expected to produce a possible overlapping of the initial images.

8. The method for creating panoramic images of the eye fundus, according to claim 7, wherein in the areas of the respective initial images for which the pre-positioning process is expected to produce a possible overlapping of the initial images, and further comprising determining which partial areas are particularly suited for block matching through structural analysis.

9. The method for creating panoramic images of the eye fundus, according to claim 8, further comprising applying the block-matching algorithm to said partial areas.

10. The method for creating panoramic images of the eye fundus, according to claim 1, further comprising determining the transformation parameters between the anchor image and the other initial images by a quadratic approach, wherein the transformation parameters between other initial images, which share mutual areas, are also determined, and determining a transformation parameter set, suitable for all initial images.

11. The method for creating panoramic images of the eye fundus, according to claim 10, further comprising determining the transformation parameter set suitable for all initial images through optimization.

12. The method for creating panoramic images of the eye fundus, according to claim 1 further comprising matching of brightness and/or color of the images during superimposition of the other images onto the anchor image and among each other.

* * * * *